United States Patent [19]

Sigrist et al.

[11] Patent Number: 5,628,452
[45] Date of Patent: May 13, 1997

[54] PACKAGE AND BLANK FOR PACKAGING CIGARETTES

[75] Inventors: Albert Sigrist, Colombier; Roberto Rizzolo, Champ du Moulin, both of Switzerland

[73] Assignee: Philip Morris Incorporated, New York, N.Y.

[21] Appl. No.: 271,396

[22] Filed: Jul. 6, 1994

[30] Foreign Application Priority Data

Jul. 6, 1993 [EP] European Pat. Off. .............. 93810477

[51] Int. Cl.⁶ .................................................. B65D 5/54
[52] U.S. Cl. ......................... 229/235; 206/273; 229/133; 229/241; 229/940
[58] Field of Search ................................. 229/87.05, 132, 229/235, 241, 242, 121, 133, 122.2, 940; 206/268, 271, 273, 274

[56] References Cited

U.S. PATENT DOCUMENTS

| | | |
|---|---|---|
| 416,115 | 11/1889 | Mayall . |
| 1,541,143 | 6/1925 | Hoile . |
| 1,673,109 | 6/1928 | Fenstermacher .................. 229/132 |
| 1,723,149 | 8/1929 | Gannon et al. .................... 229/132 |
| 1,739,529 | 12/1929 | Skinner . |
| 1,816,835 | 8/1931 | Fischer ............................ 229/87.05 |
| 1,907,067 | 5/1933 | Hartmann . |
| 1,921,150 | 8/1933 | Bomberger ........................ 229/132 |
| 2,026,477 | 12/1935 | Lescher . |
| 2,187,304 | 1/1940 | Farmer ............................. 229/132 |
| 2,285,188 | 6/1942 | Cobbs . |
| 2,485,235 | 10/1949 | Graf ................................. 229/133 |
| 2,508,193 | 5/1950 | Ringler . |
| 2,523,488 | 9/1950 | Williamson ....................... 229/133 |
| 2,881,967 | 4/1959 | Ringler . |
| 2,909,312 | 10/1959 | Conerty ............................ 229/235 |
| 3,018,031 | 1/1962 | Ahlbor et al. . |
| 3,037,683 | 6/1962 | Sherrill . |
| 3,048,324 | 8/1962 | Anderson . |

(List continued on next page.)

FOREIGN PATENT DOCUMENTS

| | | |
|---|---|---|
| 670668 | 9/1963 | Canada . |
| 697686 | 11/1964 | Canada . |
| 380898 | 8/1990 | European Pat. Off. .............. 229/121 |
| 713675 | 10/1931 | France . |
| 1033267 | 7/1953 | France . |
| 1207982 | 9/1959 | France . |
| 1277662 | 10/1961 | France . |
| 2130640 | 3/1972 | France . |
| 2261186 | 2/1975 | France . |
| 2642405 | 1/1989 | France . |
| 1883769 | 11/1963 | Germany . |
| 1255030 | 4/1964 | Germany . |
| 2207449 | 2/1972 | Germany . |
| 85 23 837.6 | 1/1986 | Germany . |
| 92 12 039.3 | 3/1993 | Germany . |
| 506544 | 7/1956 | Italy ................................... 229/235 |
| 675280 | 7/1952 | United Kingdom . |
| 929825 | 6/1963 | United Kingdom . |
| 2031386 | 4/1980 | United Kingdom . |
| 2207881 | 2/1989 | United Kingdom . |

OTHER PUBLICATIONS

The Wiley Encyclopedia of Packaging Technology, John Wiley and Sons, pp. 150-151 (1986).

*Primary Examiner*—Gary E. Elkins
*Attorney, Agent, or Firm*—James T. Moore; James E. Schardt; Charles E. B. Glenn

[57] ABSTRACT

A pack of cigarettes or of products of the tobacco industry is effectively protected against light, as well as against the loss or the penetration of humidity and the loss of aroma or off flavor of the products it contains, even though it is wrapped in a blank generally comprising only a single layer of material, when particular precautions are taken order to form the corners of the pack. Another advantage of the proposed package resides in the fact that it possesses several opening mechanism at the user's choice, permitting the latter to open his pack either as a conventional soft pack or as a hard pack. A package of this type is particularly ecological since it is preferably made up from a biodegradable material.

35 Claims, 12 Drawing Sheets

U.S. PATENT DOCUMENTS

| | | | |
|---|---|---|---|
| 3,094,265 | 6/1963 | Hovland | 229/133 |
| 3,207,417 | 9/1965 | Hennessey et al. | |
| 3,282,465 | 11/1966 | Davis. | |
| 3,411,694 | 11/1968 | Silver | 229/132 |
| 3,765,593 | 10/1973 | D'Alessio. | |
| 3,897,900 | 8/1975 | Gorski et al. | |
| 4,003,467 | 1/1977 | Focke et al. | |
| 4,303,155 | 12/1981 | Focke et al. | 229/87.05 |
| 4,513,863 | 4/1985 | Schillinger. | |
| 4,634,007 | 1/1987 | Rusnock | 229/940 |
| 4,732,276 | 3/1988 | Knecht. | |
| 4,886,161 | 12/1989 | Keidar et al. | |
| 4,890,440 | 1/1990 | Romagnoli. | |
| 5,074,412 | 12/1991 | White | 206/256 |
| 5,139,140 | 8/1992 | Burrows et al. | 206/268 |
| 5,161,733 | 11/1992 | Latif | 229/225 |
| 5,377,905 | 1/1995 | Sigrist | 229/231 |

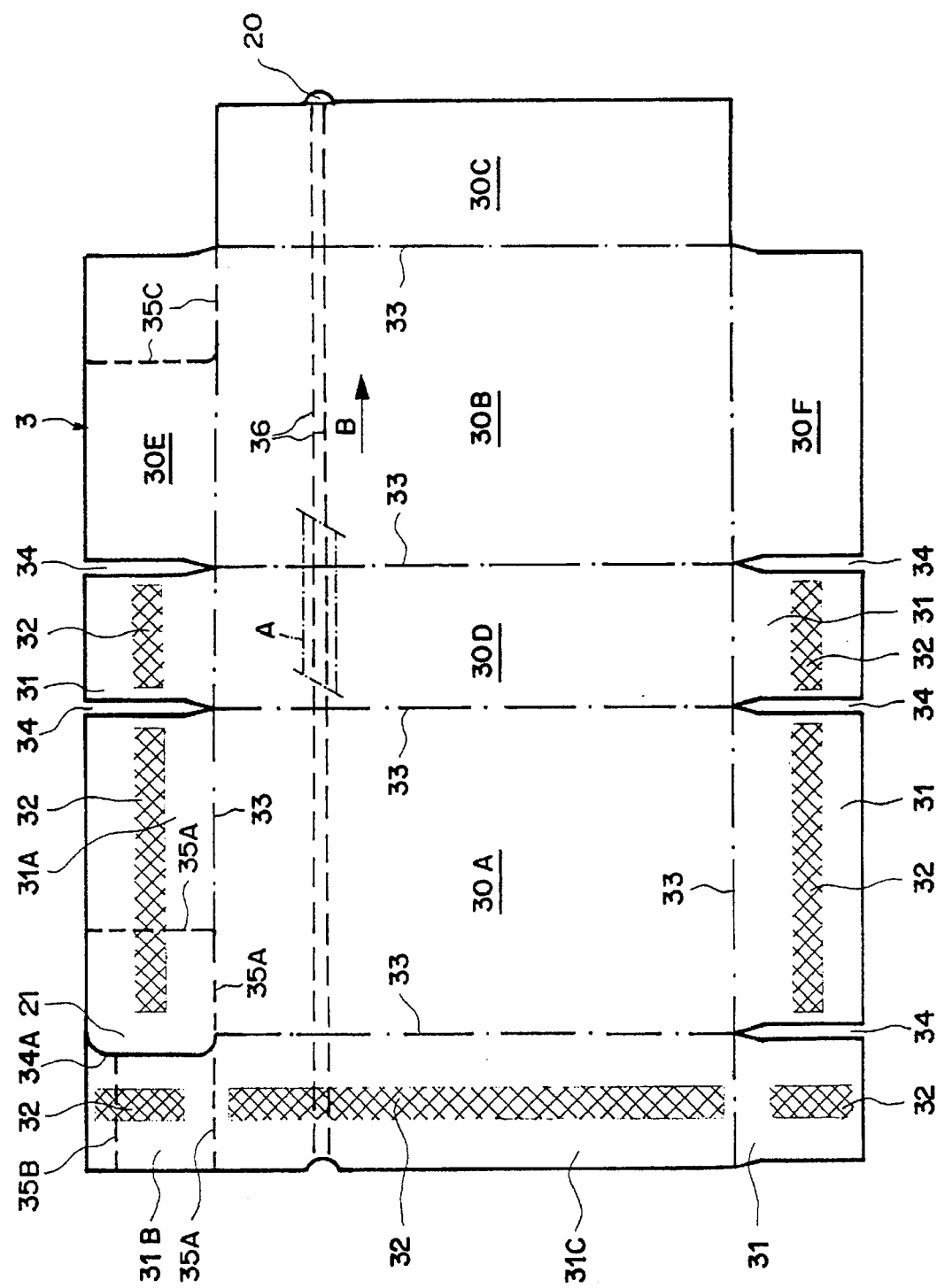

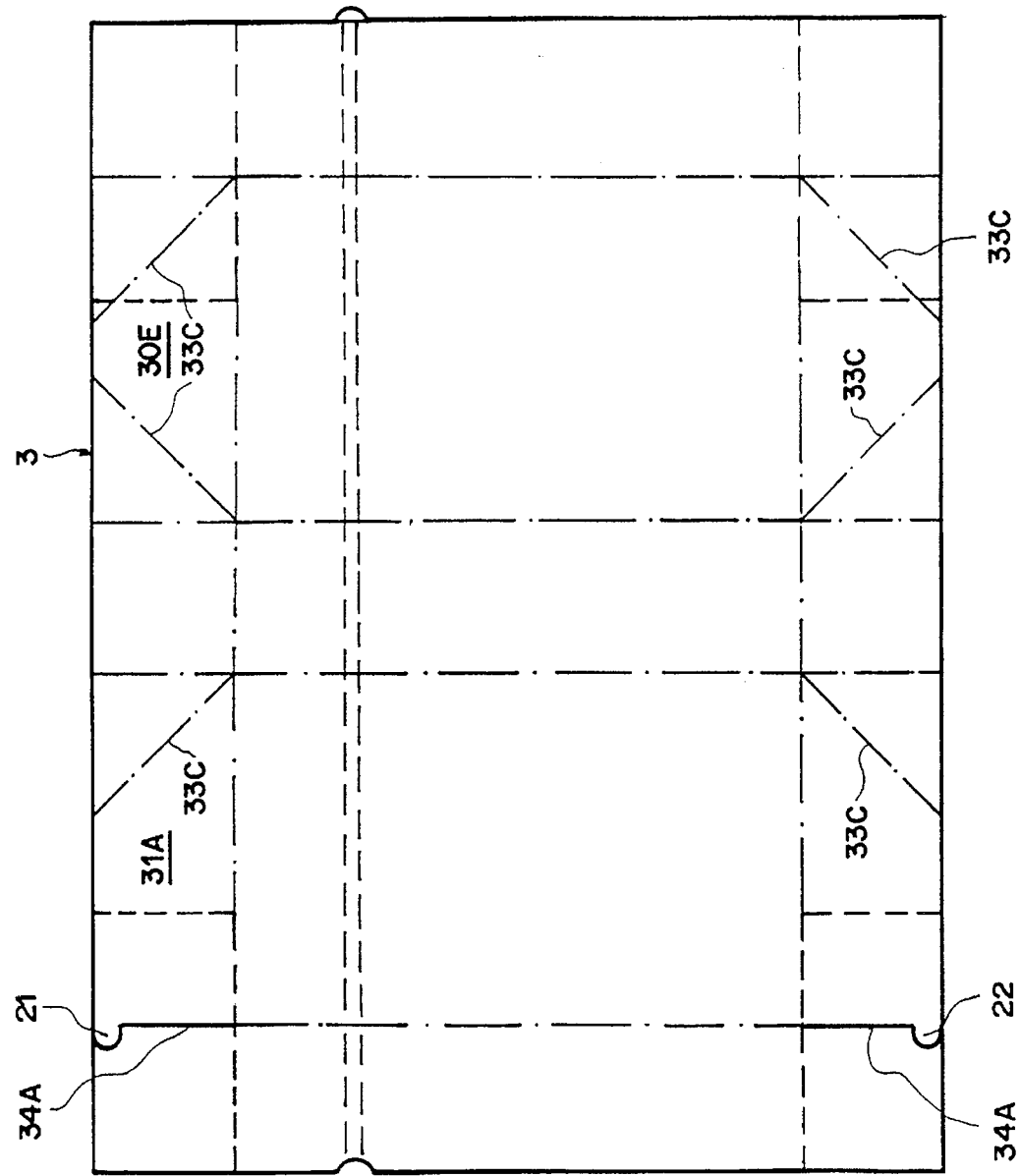

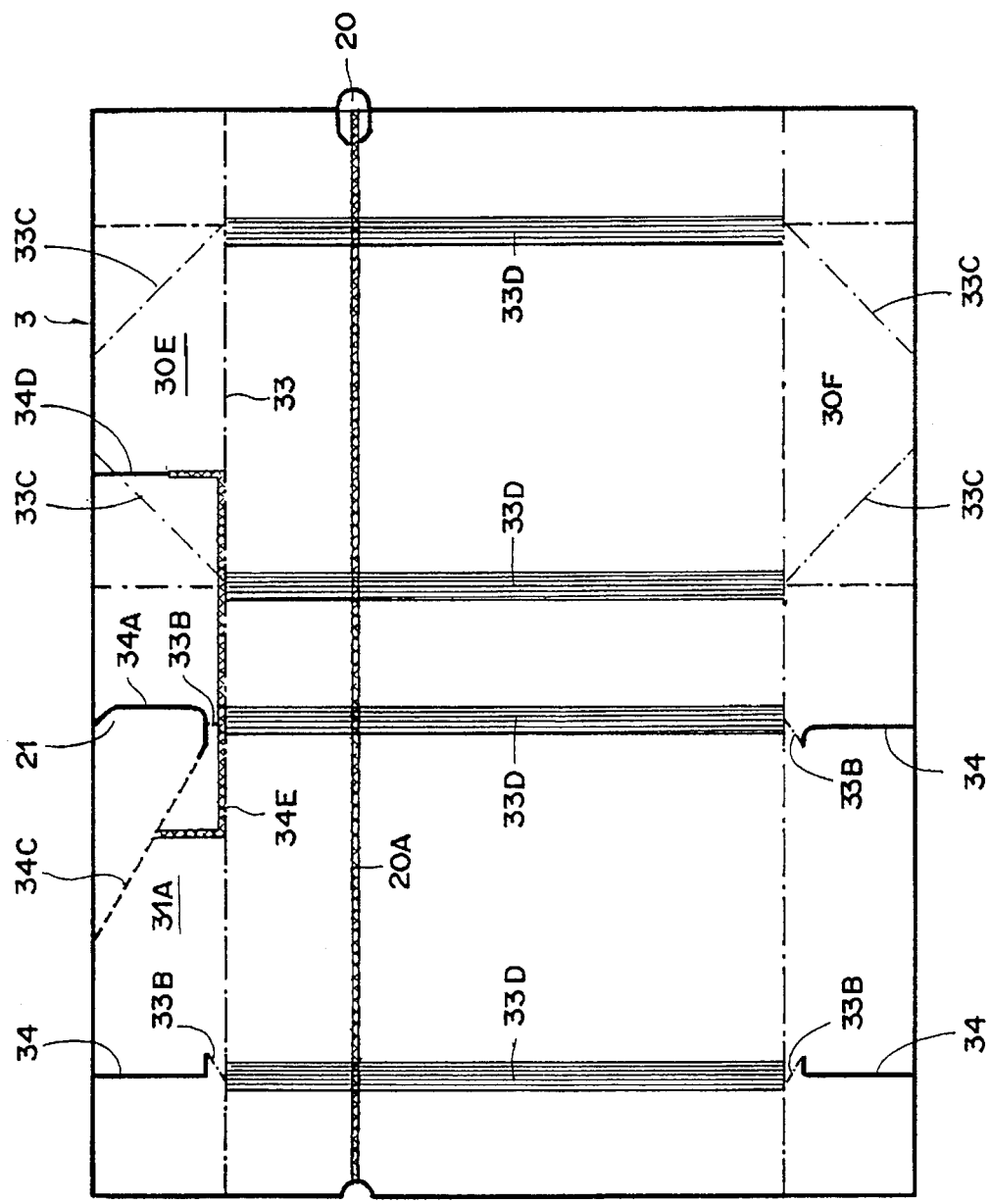

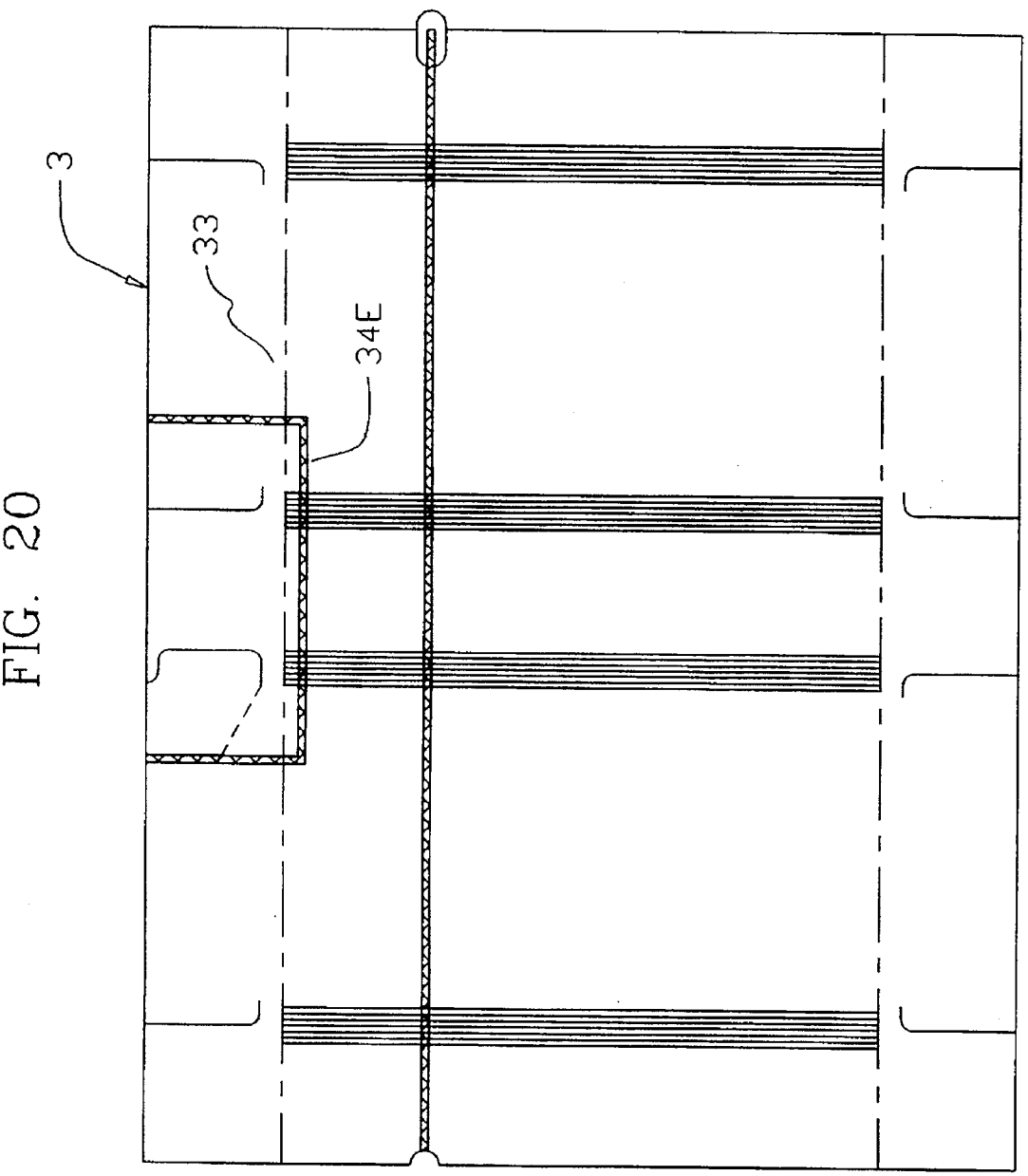

PACKAGE AND BLANK FOR PACKAGING CIGARETTES

RELATED APPLICATION

The present application relates to patent application Ser. No. 08/104,574, filed Aug. 11, 1993, entitled "Packaging Box, Blank Therefor, and Method of Assembly" now U.S. Pat. No. 5,377,905, which is hereby incorporated by reference.

BACKGROUND OF THE INVENTION

1. Technical Field of the Invention

The present invention concerns a package and associated label blank for a pack of products of the tobacco industry, especially for packs of cigarettes, made up of a single sheet or from a single blank.

2. Discussion of the Related Art

For the packs of cigarettes according to the related art, two types of packages are generally found. A first type of package is the hard package or "box," the main element of which is made up from a blank cut out of a thin sheet of cardboard. A package of this type generally includes a bottom part and a cover part, pivoting relative to the former, permitting the pack to be opened and reclosed. This type of pack has the advantage of being relatively rigid and thus protects the contained cigarettes well. A second type of package is the "soft" package, the main element of which is made up from a blank cut out of a thin sheet of paper. A package of this type generally includes a tearing tongue permitting a portion of the package to be torn and withdrawn in order to be able to access the cigarettes; it is not generally possible to reclose the pack. Although this package consumes less raw material than the preceding one, being made up of a sheet of paper instead of a sheet of cardboard, it is less rigid and protects the contained cigarettes to a lesser degree.

The two types of package above are conventionally supplemented by a plurality of layers of different materials. First the cigarettes are wrapped in a thin composite sheet comprising an aluminized face, after which the pack thus constituted is inserted in a hard or soft package as described above. This last package is subsequently covered with a transparent sheet, generally of acetate, cellophane, or polypropylene. These three physical layers each have a particular function. The aluminized sheet is opaque to protect the cigarettes from light. The layer of paper or of thin cardboard ensures the maintenance of the pack and comprises impressions of the trademark and other indications on its outer faces. The last transparent layer is sealed in order to ensure the fluid-tightness of the pack and to preserve the moisture, the aroma and the flavor of the cigarettes.

The prior packs described above possess a series of drawbacks. First, at the time of manufacture of the pack, it is necessary to dispose successively several superimposed layers of different materials, necessitating complex machines. Afterward the user must tear, open, or separate three layers before reaching the cigarettes. In addition, a package comprising these diverse layers is expensive in raw materials for its manufacture and remains expensive for its disposal since it is composed of an assembly of several materials which cannot be disposed of through the same channels, i.e., they are not jointly recyclable. Also, some of the specified materials are not able to be formed from biodegradable materials.

Another drawback of the prior packs resides in the fact that they comprise only a single possibility of opening, generally determined by the type of package considered, as described above. It may be advantageous for the user to be able to choose the type of opening he prefers, permitting him in particular to grasp the cigarettes without having to touch their filter top, or else, if he possesses for example an appropriate refillable case, to be able to open his pack in such away that it can be used in combination with this case.

The package described in FR-A-2,130,640 is of the conventional type described above, i.e., only comprising a single opening of a part of the upper face. One of the embodiments of FR-A-1,033,267 shows a package comprising two identical openings disposed at the two opposite end portions of the upper face, without resulting in any advantage for the user. The package described in DE-U-1,883,769 comprises two identical openings disposed in such a manner that the pack can be open in one sense or the other; such a package is a solution only to one of the previously discussed problems. The conception of the package according to U.S. Pat. No. 2,026,477 differs from what has been described up to now, in that the package can be opened in two steps, by the same type of opening, in order to reach initially the first cigarettes then afterwards those remaining in the pack. The packing according to U.S. Pat. No. 5,139,140 is a "box" package which conventionally consists of a plurality of superimposed sheets and comprises two openings of different type. It is well known to one skilled in the art that the hard packages of the "box" type are conceived quite differently from those of the "soft" type as in the invention. Moreover, none of the above-mentioned packages attempts to solve the problem of reducing the number of the necessary superimposed layers, which notably results in a waste of raw materials and makes disposal of the scraps resulting from these packages difficult.

OBJECTS OF THE INVENTION

A first object of the invention is therefore to obtain a package for a pack of cigarettes or other products of the tobacco industry not comprising the mentioned drawbacks of the prior packages, i.e., being made up of a single packaging sheet, preferably recyclable and/or biodegradable, and nevertheless answering the requirements of impermeability to light, of keeping the pack in shape, and of maintaining the inside moisture, aroma, and flavor of the cigarettes.

A second object of the invention is to obtain a package comprising more than one types of opening, i.e., permitting the user to choose the mode of use of his pack.

Another object of the invention is to obtain a package producing a minimum of refuse, both during manufacture and during use, and using a minimum of raw material for its manufacture.

Additional objects and advantages of the present invention are apparent from the specification and drawings which follow.

SUMMARY OF THE INVENTION

A pack of cigarettes or of products of the tobacco industry is effectively protected against light, as well as against the loss or the penetration of humidity and the loss of aroma or off flavor of the products it contains, even though it is wrapped in a blank generally comprising only a single layer of material, when particular precautions are taken order to form the corners of the pack. Another advantage of the proposed package resides in the fact that it possesses several opening options, at the user's choice, permitting the latter to open his pack either as a soft pack or as a hard pack. A package of this type is particularly ecological since it is preferably made up from a biodegradable material.

BRIEF DESCRIPTION OF THE DRAWINGS

The invention is explained in more detail below vis-à-vis the enclosed drawing comprising the figures in which:

FIG. 4 depicts an embodiment of a package blank according to the invention;

FIG. 13 depicts another embodiment of a package blank according to the invention;

FIG. 17 depicts still another embodiment of a package blank according to the invention;

FIG. 20 depicts still another embodiment of a package blank according to the invention.

DETAILED DESCRIPTION OF THE PREFERRED EMBODIMENTS

Figure 1:
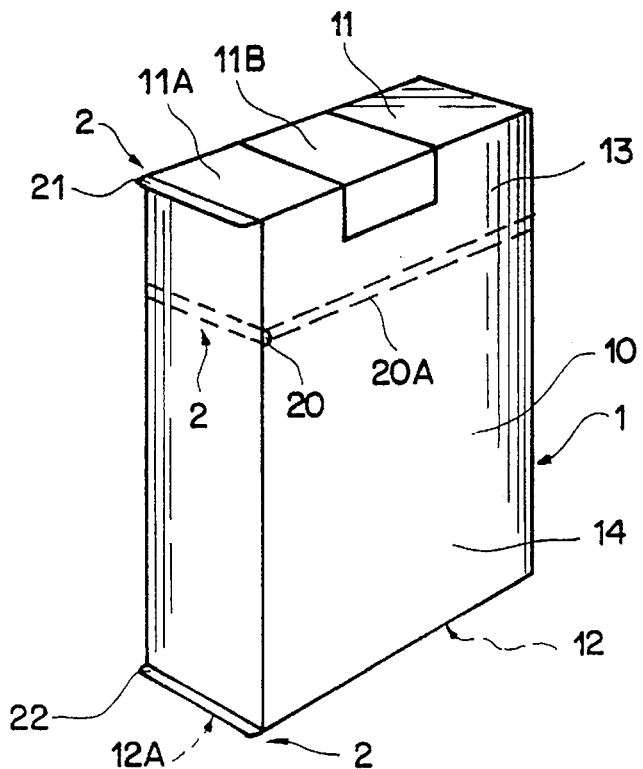
FIG. 1 depicts diagrammatically a preferred embodiment of a cigarette pack according to the invention, finished in the closed state.

The pack of cigarettes 1 of FIG. 1 is made up of a single packaging sheet or blank 10; it is depicted here in the closed state. The opening mechanisms generally designated by numeral 2, available for the opening of the pack 1, here include a first tongue 20 permitting the tearing or pulling of a peripheral pull strip 20A disposed on the front, back and two side faces of the pack and defined by one or two opening lines made as will be seen below, in order to separate an upper portion 13 of pack 1 from the lower portion 14, a second tongue 21 permitting tearing of a portion 11 of the upper or top face 11 of the pack, and a third tongue 22 disposed in the same way and symmetrically with the preceding tongue 21 and permitting tearing of a portion 12A of the lower or bottom face 12 of the pack 1 by other opening lines. The finished pack of cigarettes is generally provided with a guarantee label 11B.

The usefulness for the user of the presence of multiple opening means 2 is explained below vis-à-vis FIGS. 2, 3A, and 3B.

Figure 2:
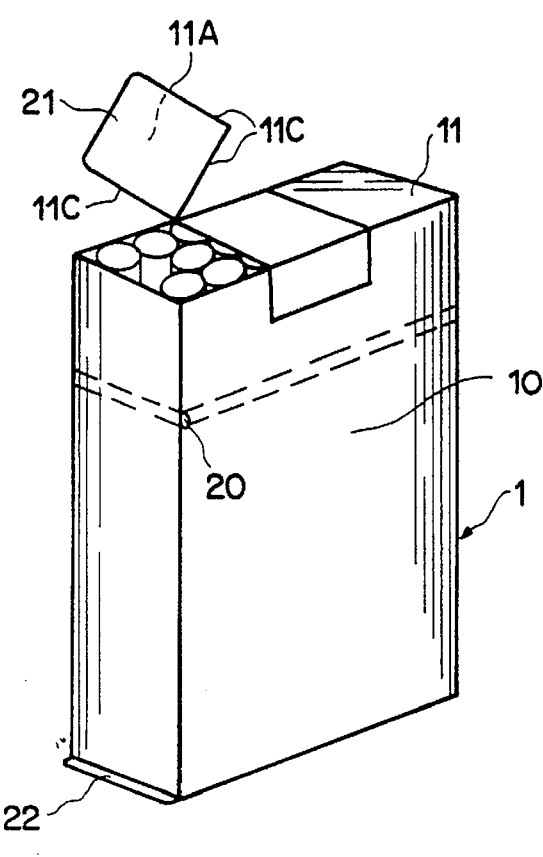
FIG. 2 depicts the same pack of cigarettes opened according to one of the opening possibilities.

The pack 1 of FIG. 2 has been opened by acting upon the tongue 21, so as to tear and pull away the portion 11A of the upper end face 11 of the pack. This mode of opening generally corresponds to that used for an ordinary soft pack. Tear starts 11C along opening lines have been provided over the periphery of the portion 11A, permitting the portion 11A to be easily withdrawn by effecting traction on the tongue 21. In this way, since the package is made up of the single blank 10, the cigarettes are directly accessible without it being necessary to withdraw other portions of other packaging layers. Seeing that, in the case of filter-tip cigarettes, these are disposed in the pack 1 with the filter facing toward the top of the pack, a smoker, e.g., working on a building site or a machine and having dirty fingers, can then choose to pull on the tongue 22, in place of the tongue 21, to pull away the portion 12A of the lower end face 12 of the pack. By grasping a cigarette by its end opposite the filter, he does not risk soiling a portion of the cigarette which he must subsequently put into his mouth. A pack opened according to this second mode of opening is not directly depicted, but it is easily understood since the pack 1 is then simply inverted as compared with that depicted in FIG. 2. See the blank of FIG. 9, discussed below.

Figure 3A:
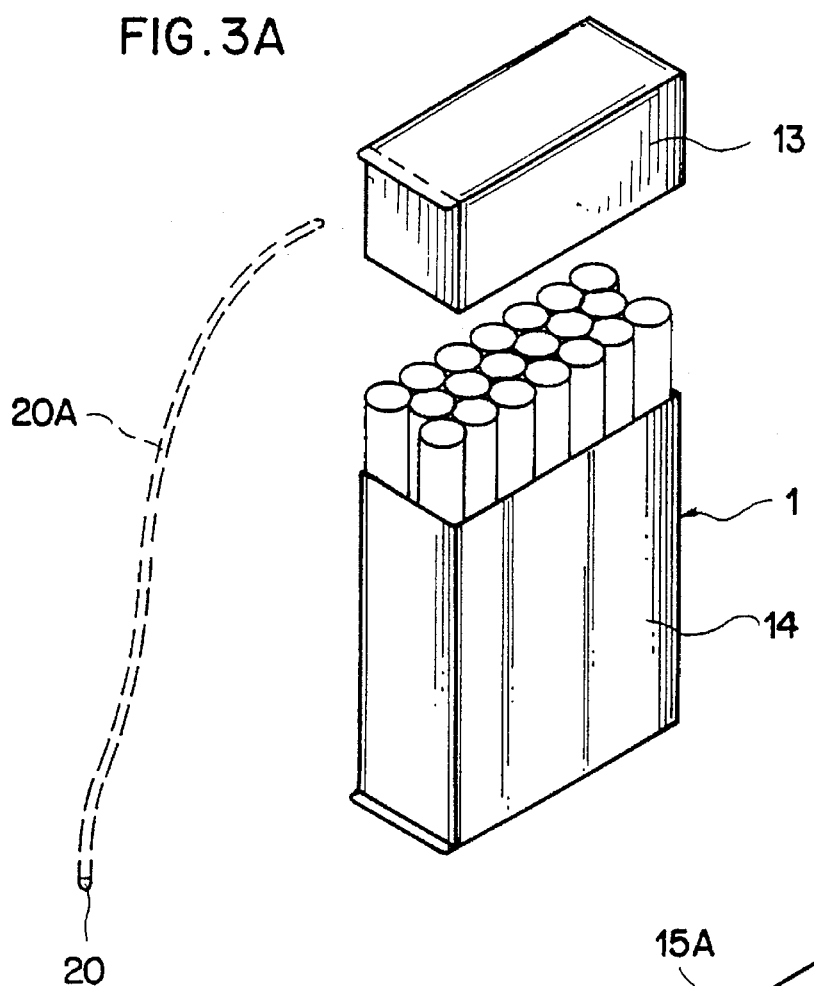
FIG. 3A depicts the same pack of cigarettes opened according to another opening possibility.
Figure 3B:
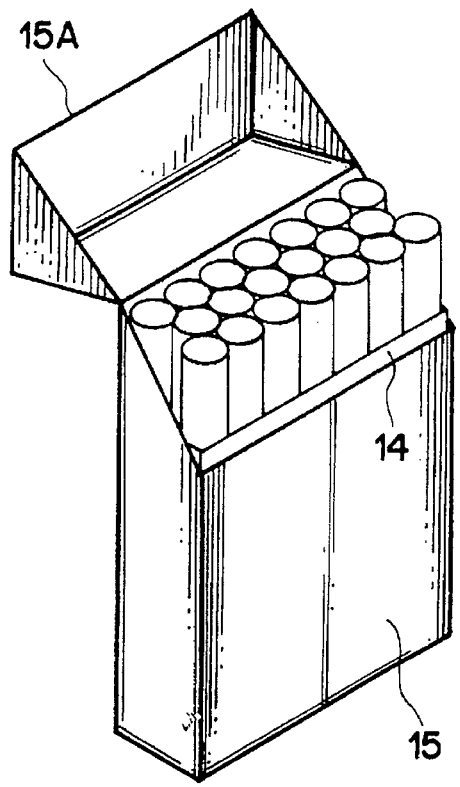
FIG. 3B depicts the pack of cigarettes of FIG. 3A inserted in a rigid outer case.

The use of the opening of the pack by the tongue 20 is depicted in FIGS. 3A and 3B. By exerting traction on the tongue 20, the user tears and pulls off the pull strip 20A which follows the periphery of the pack 1, separating the latter into an upper portion 13 and a lower portion 14 which contains the cigarettes. The upper portion 13 as well as the pull strip 20A can be thrown away. The open pack as it appears in FIG. 3A can be used as is, but it will preferably be inserted as a refill in an outer case 15 shown in FIG. 3B, comprising a closure depicted as 15A by way of example, in such a way that the cigarettes may be better protected. The outer case 15 is preferably reusable, it may for example be of cardboard, of synthetic material, of metal, or of any other suitable material. In this way, the user, buying a soft-type pack of cigarettes, benefits by the advantages of a hard-type pack, without the drawback of a waste of raw material. The outer case 15 may comprise a representation of the cigarette brand or else a completely different decoration.

The pack of cigarettes advantageously comprises the three means of opening described above, but it is obvious that it may also comprise only two of them, for example those constituted by the two tongues 21 and 22, or one of the tongues 21 or 22 and the tongue 20. The possibilities of opening by the user will therefore be defined accordingly.

FIG. 4 shows a first embodiment of a label blank 3 according to the invention permitting a package for a pack of cigarettes according to the invention as described previously to be produced by flat foldings. The blank 3 is made up of a single sheet, preferably starting from a thin sheet of paper, but also being able to be of another material, for example a thin synthetic material or a composite assembly; preferably, the material used will be easily disposable, being recyclable or else biodegradable. It is also possible to use a thin, laminated and/or lacquered sheet of paper, on one or on both faces of the blank, these laminating and/or lacquering operations being able to be effected before or after blanking of the blanks and making of the opening lines and of the folding ribs as described below. Thus a soft-type package is obtained, but nothing prevents the blank 3 from being made up from a relatively rigid sheet, permitting a package resembling a hard-type package from being obtained. The blank 3 is cut out from a sheet of large dimensions or else cut out on a web, the width of which corresponds either to the width or to the length of the blank. Since the package comprises only a single layer, the blank 3 must be sufficiently opaque to light in order to protect the cigarettes therefrom, which permits avoiding the layer of aluminized paper. The blank 3 is composed, as already known, of a plurality of panels intended to form the faces of the pack, i.e., the frontal panels 30A and 30B intended to form the front and rear, or back, frontal faces, respectively, the side panels 30C and 30D intended to form the front and rear side faces, respectively, and the cover panels 30E and 30F intended to form the top and bottom cover faces, respectively. The blank is completed by a plurality of gluing panels 31, 31A, 31B, and 31C comprising gluing zones 32 necessary for closing the pack after assembly. It is noted in this embodiment of the blank 3 that the panels constituting the upper and lower right-hand corners are eliminated. This reduces the weight of the empty package but, on the other hand, necessitates more complicated cutting tooling. These corners can be maintained in the same way as in the embodiments which will be described later. Folding lines 33 are made by known tooling at the time of the blanking of the blank 3, in the form of a molding facilitating the formation of the fold between the different panels at the time of assembly of the pack. These folding lines 33 bound the different panels mentioned above which are not separated by a cut as indicated below. Cuts 34, 34A separate the cover panels from the gluing panels and the latter from one another in order to permit flat folding of the panels and the assembly of the pack.

The cut 34A separating the gluing panels 31A and 31B intended to become positioned under the top cover panel 30E is of particular shape since it overlaps the gluing panel 31B in order to form a first projection, remaining adjoining the gluing panel 31A, and corresponding to the pulling tongue 21 of the FIGS. 1 and 2. A first opening line 35A is contrived opposite the first projection, corresponding to the pulling tongue 21. Opening line 35A extends so as to be able to separate the gluing panels 31B and 31C, then over part of the folding line 33 separating the panels 30A and 31A, and then extends transversely to the gluing panel 31A. The gluing panel 31B may comprise another opening line 35B which will juxtapose the last mentioned part of the opening line 35A when the panel 31A is folded down over the panel 31B. Another opening line 35C is contrived on the opposite portion of the panel 30E in order to correspond to the line 35A when the panel 30E is superimposed on the panel 31A. The opening lines 35A, 35B, and 35C mentioned above correspond to the tear starts 11C of the finished pack, as depicted in FIG. 2.

Another projection on an edge of the front side panel 30C, corresponds to the pulling tongue 20 of the FIGS. 1, 2, and 3A, and is cut out of a portion of a side edge of the opposite gluing panel 31C. Another opening line 36, here made up of two parallel, slightly spaced lines, is contrived from the projection 20, across the panels 30C, 30B, 30D, 30A, and 31C defining the frontal and side faces of the pack of cigarettes and correspond to the opening lines of the pull strip 20A of FIG. 3A. As a variation, it is also possible for the opening line 36 to be made up of only a single line acting as a lower edge of the upper part 13 of the pack and permitting it to be pulled away when the user pulls on the tongue 20.

After assembly in a known manner, by folding the panels down about the folding lines and gluing by the gluing zones, the finished pack 1 of cigarettes is obtained as depicted in FIG. 1. The example of blank 3 described above does not comprise the projection permitting the pulling tongue 22 to be made, but it is straightforward to contrive the configuration of the bottom cover panels in the same way as described for the top panels in order to have this tongue 22.

Since, as mentioned previously, it is important that the package of the pack of cigarettes be fluid-tight, and since the package is made up of a single thin sheet, particular precautions must be exercised in the formation of the corners of the pack, made up of the points of junction of a cut on a folding line. For the embodiment of the blank 3 depicted here, a pack corner made up in this way is not generally being absolutely fluid-tight.

To improve this, it is possible specially to form the cuts 34 of FIG. 4 according to one or the other of the ways depicted in FIGS. 5A to 5D. Considering for example the cut 34 separating the top panels 31 and 30E, the cut 34 according to the embodiment of the FIG. 5A does not go as far as the folding line 33 as depicted in FIG. 4 but stops before that folding line, the remaining portion being supplemented by a folding-line start 33A as a continuation of that separating the side panels 30D and 30B. In the embodiment of the cut 34 depicted in FIG. 5A, the latter is in fact composed of two parallel cut lines encroaching on each of the panels 31 and 30E, the ends of the cut lines joining one another at the end of the folding-line start 33A. It would be just as possible to have a single cut line in the alignment of the folding-line start 33A.

Figure 5A:
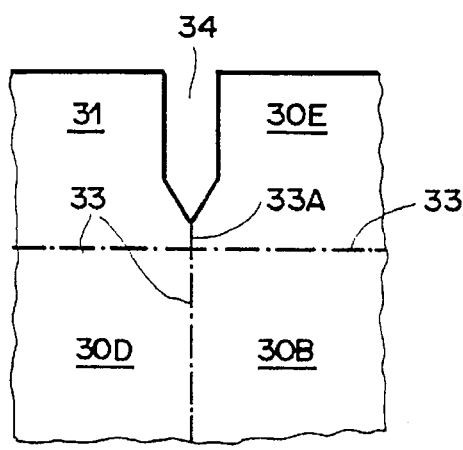
FIG. 5A depicts a first embodiment of a blank of a package label.
Figure 5B:
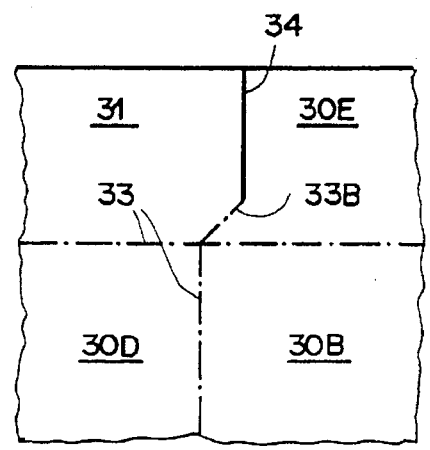
FIG. 5B depicts a second embodiment of a blank of a package label.

FIG. 5B shows a variation of the example of cut 34 of FIG. 5A, where the cut 34 is made on only a single one of the panels, here the panel 30E, along a line parallel to the ideal line separating the two panels 31 and 30E, this cut 34 being supplemented by a 45° folding-line start 33B joining the point of intersection of the folding lines 33.

Figure 5C:
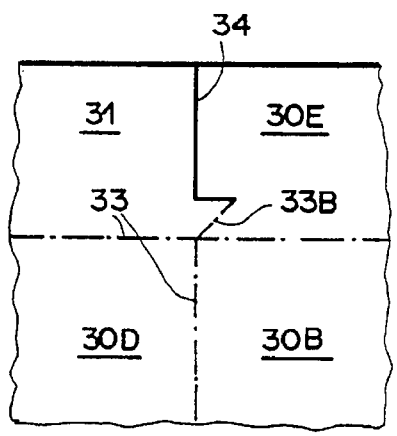
FIG. 5C depicts a third embodiment of a blank of a package label.
Figure 5D:
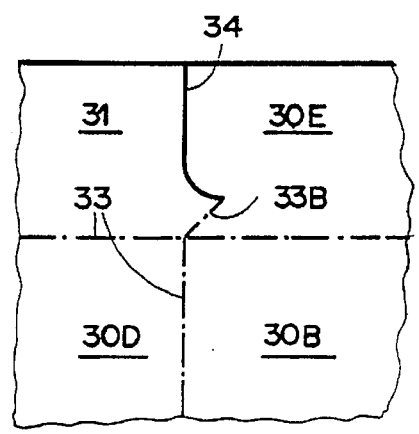
FIG. 5D depicts a fourth embodiment of a blank of a package label.

The cut 34 according to the embodiments of FIGS. 5C and 5D is made in the continuation of the folding line 33 separating the two panels 30B and 30D and is made only on a portion of the width of the panels 31 and 30E, and ends with a 90° (FIG. 5C) or rounded cut portion (FIG. 5D). From the end of this 90° or rounded cut portion, there is a 45° folding-line start 33B which joins the point of intersection of the folding lines 33.

At the time of assembly of the pack, made up from a blank comprising cuts according to one or the other of these variations, a diamond-shaped fold will be formed on the folding-line start 33A or 33B, respectively, which will ensure the fluid-tightness of this corner of the pack. The examples described above have been described relative to the corner defined by the panels 30B, 30D, 30E, and 31; it is obvious that the other corners of the pack my and preferably will also be cutout according to one of these embodiments in order to ensure the total fluid-tightness of the pack.

Figure 6:
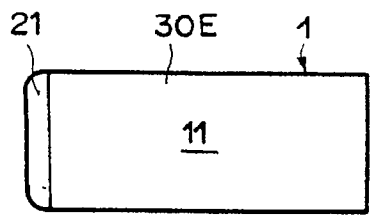
FIG. 6 depicts a top view of a pack of cigarettes made from a blank according to the embodiment of FIG. 4.

Once assembled from a blank 3 as described above, the pack 1 has its top and bottom faces 11 and 12 formed of a complete panel, or the panels 30E and 30F, respectively, as is seen in FIG. 6, which depicts a pack 1 viewed from above. According to the embodiment depicted, the panel 30E covers the panel 31A to which the tongue 21 is attached in order to facilitate the opening of the pack; however, nothing would prevent the panel 31A from covering the panel 30E. A bottom view of the same pack would be absolutely similar if a tongue 22 is employed.

For the same reasons of fluid-tightness as mentioned previously, particular precautions are to be brought to the making of the opening lines 35A, 35B, 35C, and 36 defining the portions of the pack to be pulled away at the time of its opening. In view of the slight thickness of the sheet constituting the blank 3, it is generally difficult to make an opening line by cutting out only a portion of the thickness of the sheet. According to a first embodiment of the opening lines, the latter will be made up of punctual cuts, each being followed by a non-cut zone. In this case, and in order to ensure the fluid-tightness of the pack, after the punctual cuts have been carried out, they must be covered with a fluid-tight coating. For this purpose, either a thin covering sheet can be laminated over the punctual cuts or over the whole of the blank 3, or the punctual cuts can be covered with a light layer of wax, or else it can be arranged that the motif or inscription of the cigarette brand to be printed on the outer faces of the packet be composed of an ink having good covering power and entirely covers the punctual cuts, as depicted for example at section A for a portion of the opening lines 36 in FIG. 4. In fact, it is not absolutely necessary for all the opening lines carried out in panel portions intended to be superimposed during assembly to be fluid-tight. It suffices for the opening line carried out on one of the superimposed layers to be fluid-tight.

Figure 7:
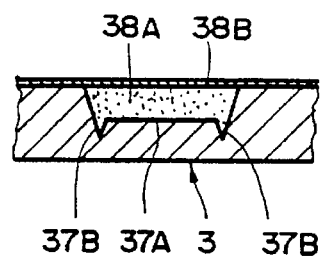
FIG. 7 depicts an embodiment of an opening.

According to another embodiment of the opening lines, it is possible to eliminate them while taking the precaution of orienting the blank 3 in the direction of the fibers of the paper constituting the blank. In case all or the majority of the fibers are oriented horizontally, i.e., in the direction depicted by arrow B in FIG. 4, the opening lines 35B and 36 as well as the horizontal parts of the pre-cut lines 35A and 35C may be eliminated, the paper offering but little resistance to ripping off in this direction when the user pulls on one or the other of the pulling tongues. As concerns the portions of the opening lines 35A and 35C disposed perpendicular to the orientation of the fibers, these portions of lines may be replaced by folding lines, which will facilitate pulling them off. The opening lines may also be made in a way rather similar to the folding ribs, as is seen in FIG. 7, which depicts an opening line established in the thickness, depicted greatly enlarged, of a blank 3. By passing a knurling tool effecting a partial crushing or depression 37A of the thickness of the blank 3, followed by passing one or two rotary knives effecting at least one additional reduction of thickness 37B of the thickness of the blank, one or two opening lines of low resistance are obtained, which it will be easy to pull away. The rotary knife or knives may also form part of the knurling tool, the opening line then being made in a single operation. Opening lines established according to one of the last two ways which have just been described necessitate no particular precaution to ensure their fluid-tightness seeing that perforations do not go through the blank 3.

The opening line or lines established as depicted in FIG. 7 may be made on the face of the blank 3 corresponding to the inside of the pack or on that corresponding to the outside of the pack; in the latter case, the hollow line created by knurling will preferably be filled with a coating 38A, preferably laminated, and a lacquered layer 38B further being disposable on the surface of the blank in order to render it perfectly plane.

Figure 8:
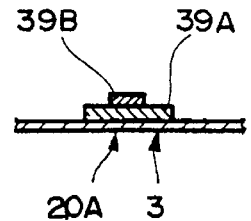
FIG. 8 depicts another embodiment of an opening.

Still another embodiment of the opening lines is depicted in FIG. 8, where there is a portion viewed in section of a blank 3 in the region of a pull strip, for example the pull strip 20A of FIGS. 1 or 3A. On the face of the blank 3 which will be turned toward the inside of the pack, an adhesive strip 39A is stuck so as to follow the opening line, a traction strip 39B made of a material possessing relatively high breaking strength being superimposed on the adhesive strip 39A. The end of the traction strip 39B may be arranged in order to form the tongue 20. By pulling on this tongue, then on the traction strip, the pack is opened all along this traction strip. The blank 3 may or may not be provided with one or more pre-cut lines disposed along the adhesive strip, the latter ensuring the fluid-tightness of the package. The adhesive strip 39A as well as the traction strip 39B will also preferably be of recyclable and/or biodegradable materials.

The diverse embodiments of the opening lines described above may obviously be combined with one another, some of them being better adapted to one or the other type of means for opening the package.

The gluing zones 32 depicted in FIG. 4 are depicted only by way of example; their shapes, locations, and dimensions may vary according to the embodiment of the blank, one skilled in the art knowing how to adapt them in order to obtain the best quality of the assembled pack. These gluing zones are no longer depicted in the embodiments of the blank which follow, but it is well understood that each of them comprises such zones. According to the material used for the blank or covering it, it is also possible to replace the gluing zones by self-sealing zones or zones sealing under the influence of the temperature and/or of a pressure which is applied to them.

Figure 9:
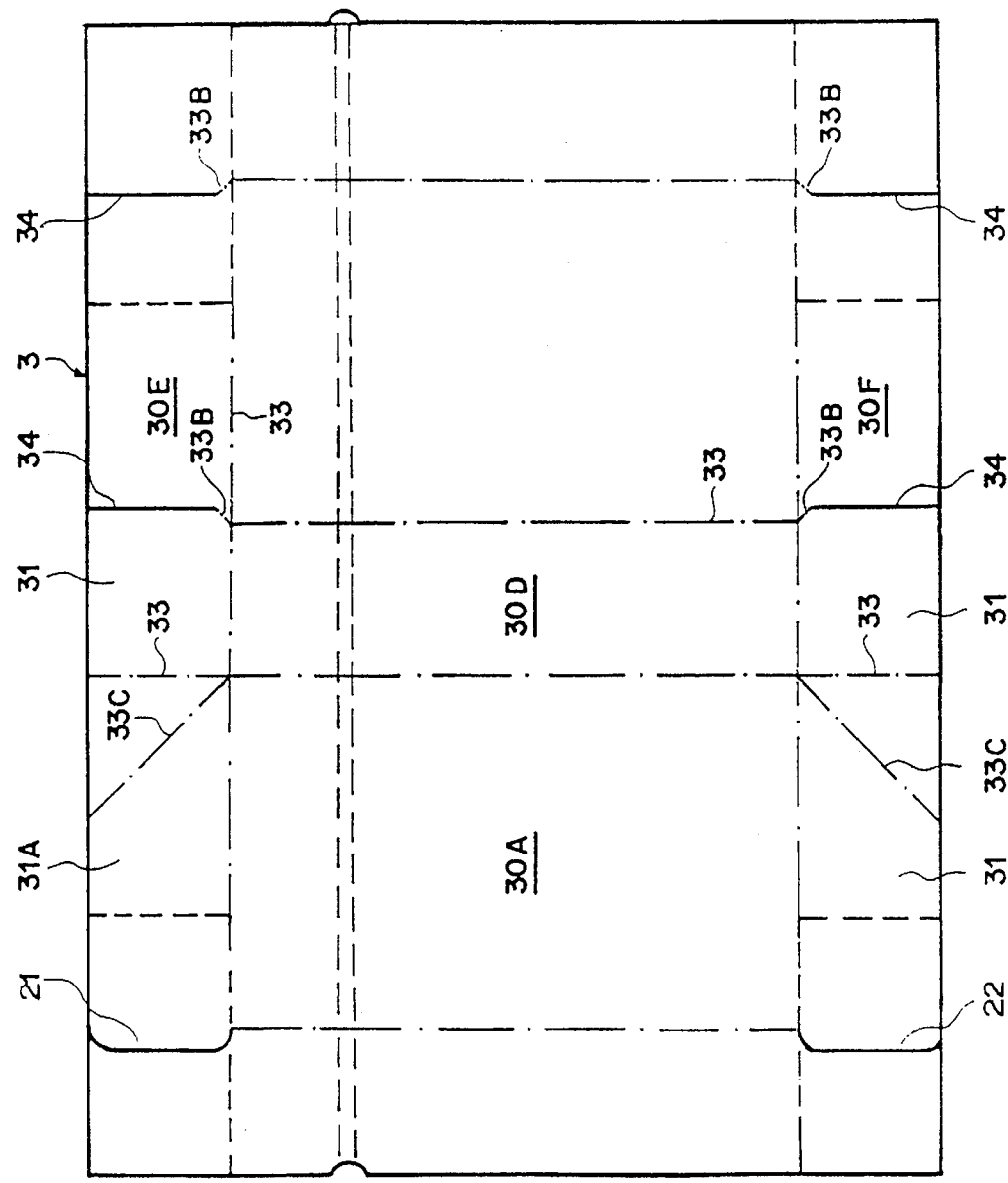
FIG. 9 depicts another embodiment of a package blank according to the invention.
Figure 10:
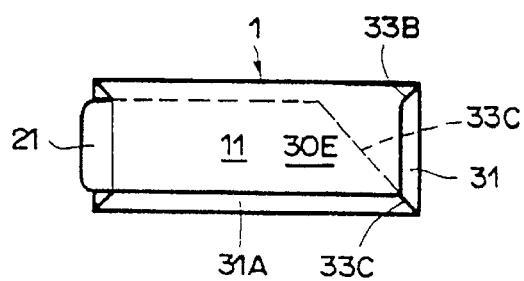
FIG. 10 depicts a top view of a pack of cigarettes made from a blank according to the embodiment of FIG. 9.

The blank 3 of FIG. 9 is another embodiment of the label blank described above, permitting the package to be produced by a combination of flat foldings and diamond-shaped foldings. It is generally made up of the same panels as the preceding blank embodiment described. The panels of the upper and lower right-hand corners are depicted here; however, they are not absolutely necessary. This embodiment further comprises a second projection adjacent to the bottom gluing panel 31, intended to form the lower pulling tongue 22. The main differences between the two embodiments concern the way in which the cuts are made between the top 30E or bottom 30F cover panels, respectively, and the gluing panels 31 or 31A which are adjacent to them. First of all, the cuts 34 disposed on either side of the panels 30E and 30F are made according to the embodiment described vis-à-vis FIG. 5B, i.e., cuts 34 include a 45° folding-line start 33B from the end of the cut to the intersection of the folding lines 33. In addition, the gluing panels 31 or 31A, adjacent to the frontal 30A and side 30D panels, are no longer separated by a cut but remain connected by a folding line 33, intended to be folded in reverse direction from the other folding lines described previously. Supplementing this, two other 45° folding lines 33C, crossing the width of the panels 31A and 31, permit the diamond-shaped folding of the corners on which these different folding lines meet. Such a blank embodiment permits making a pack having better fluid-tightness than that made with a blank according to the preceding embodiment. Viewed from above, a finished pack with a blank according to this second embodiment has the appearance depicted in FIG. 10. The panel 30E forming the upper face 11 has been depicted with a lesser width than that of the pack 1 in order to show partially the folded lower layers.

Figure 12:
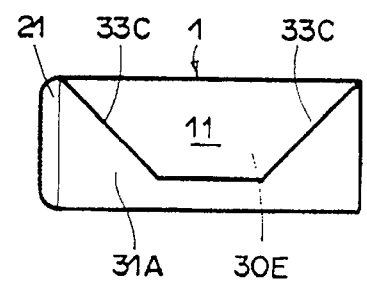
FIG. 12 depicts a top view of a pack of cigarettes made from a blank according to the embodiment of FIG. 11.
Figure 11:
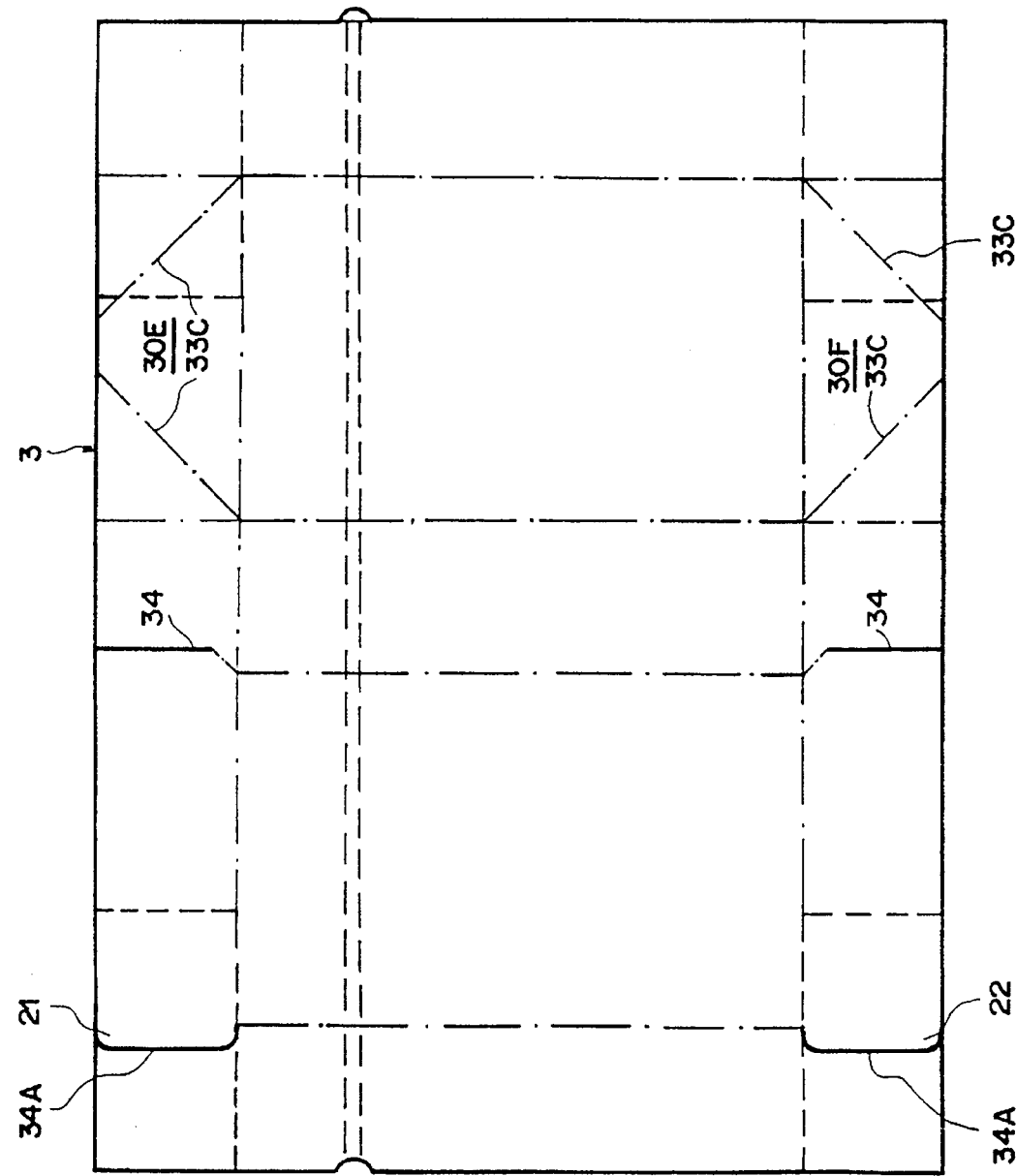
FIG. 11 depicts another embodiment of a package blank according to the invention.

FIG. 11 shows another embodiment of the label blank 3 where, in comparison with the embodiment of FIG. 9, the 45° folding lines 33C are transferred onto the top 30E and bottom 30F cover panels, permitting more diamond-shaped folds to be produced. In this case, the cuts 34 remain between the gluing panels. When assembled, the pack viewed from above is similar to that depicted in FIG. 12. The advantage of this embodiment of the blank resides in the fact that at the time of assembly of the pack, fewer superimposed layers are encountered for the formation of the top and bottom faces of the pack, which facilitates their gluing or sealing.

Figure 14:
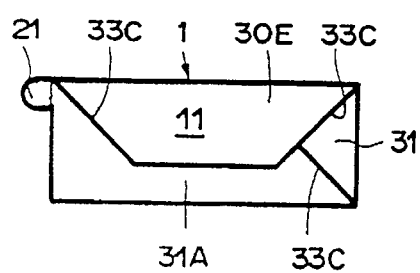
FIG. 14 depicts a top view of a pack of cigarettes made from a blank according to the embodiment of FIG. 13.

The label blank 3 of FIG. 13 differs from the preceding ones in that it comprises no more than the two cuts 34A which define the projections which will constitute the tearing tongues 21 and 22. It is further noted that the shape of these tongues is different from that of the tongues depicted previously, i.e., it is a half-ellipse, and that the tongues in question may be of any suitable shape. The elimination of the other cuts entails the formation of the 45° folding lines 33C on each of the corners concerned of the blank. After assembly, the pack 1 will have the appearance, viewed from above, as depicted in FIG. 14, its fluid-tightness being further improved as compared with the preceding packs, since more corners are folded diamond-shaped.

Figure 16:
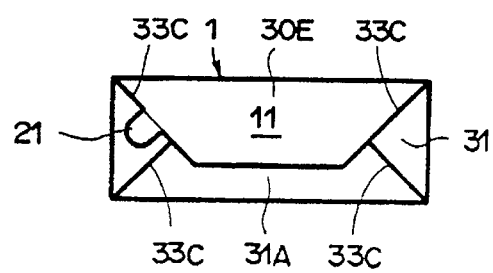
FIG. 16 depicts a top view of a pack of cigarettes made from a blank according to the embodiment of FIG. 15.
Figure 15:
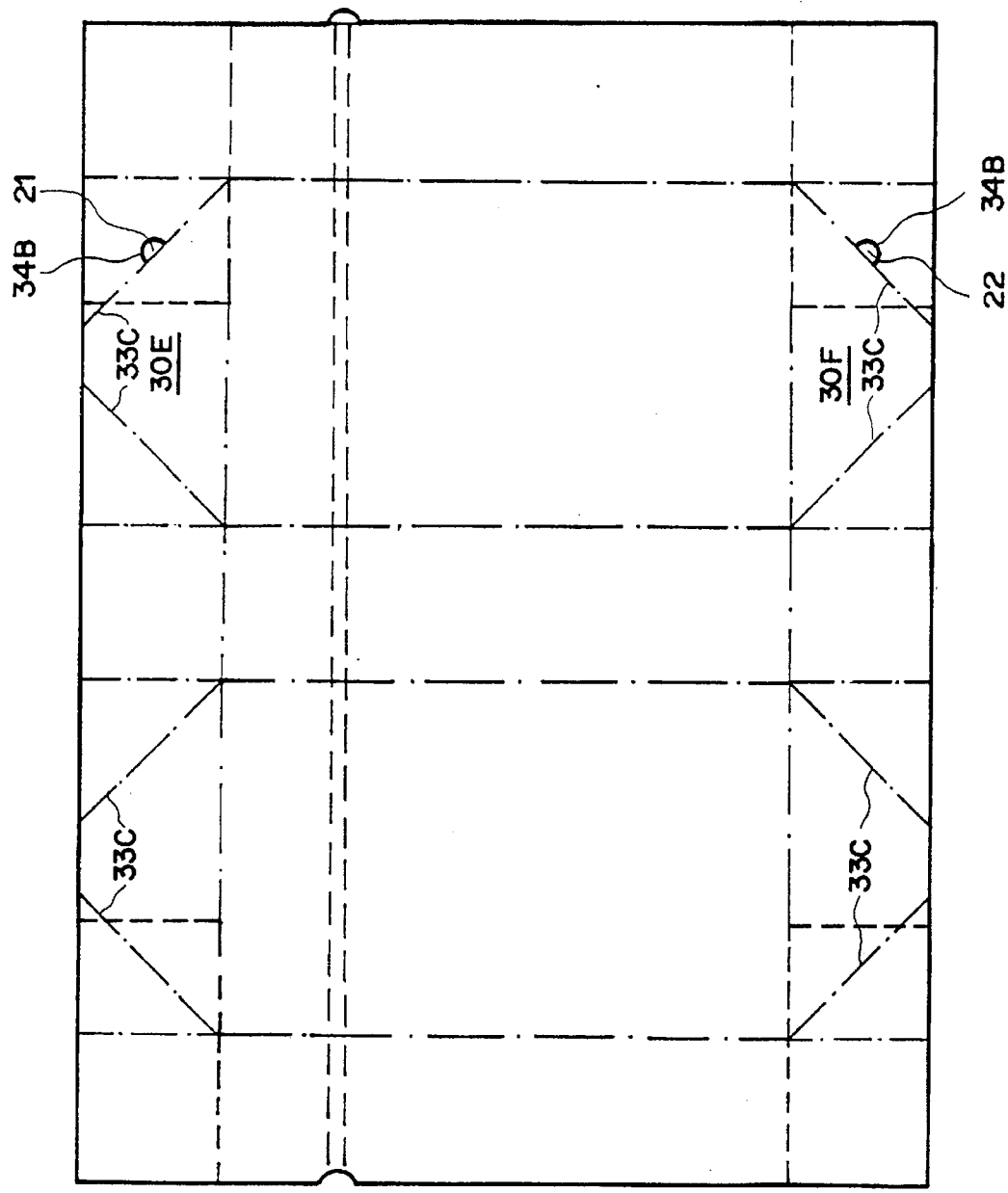
FIG. 15 depicts still another embodiment of a package blank according to the invention.

FIG. 15 shows still another embodiment of the label blank 3 where the panels are no longer separated by cuts but are all connected by folding lines 33C, as in the preceding embodiment, permitting the diamond-shaped folding of the entirety of the panels forming the top and bottom faces in the same way as an ordinary soft pack. A single cut 34B, here half-moon or half-ellipse shaped, is made on the panel 30E and optionally on the panel 30F, in order to constitute the tearing tongue or tongues 21 and 22. Owing to the presence of folding lines 33C on each of the corners of the pack, the latter more is perfectly fluid-tight. Its representation viewed from above is shown in FIG. 16.

FIG. 17 shows still another embodiment of a label blank 3. It is characterized mainly by a particular way of making the folding lines 33D corresponding to the side edges of the finished package. For this embodiment, the folding lines 33D also undergo knurling in order to reduce the rigidity of the blank at this location. The width of the knurling equals about a quarter of the perimeter of a cigarette, so that when the package is assembled, the pack 1 viewed from above of FIG. 18 has its four side edges in rounded shape, following the inside shape produced by the cigarettes. The knurled parts of the side edges, too, may be covered by lamination and/or by lacquering. In this way, it is possible to reduce the length of the blank 3 by a few mm, which, in view of the considerable quantities of blanks potentially manufactured, leads to substantial savings on raw material and also contributes toward reducing the scrap.

Figure 18:
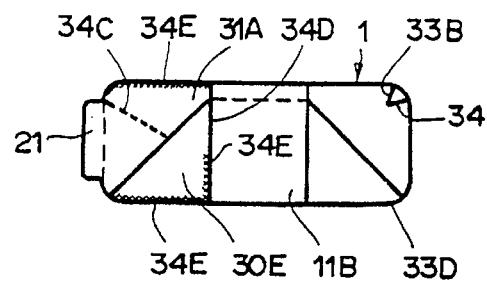
FIG. 18 depicts a top view of a pack of cigarettes made from a blank according to the embodiment of FIG. 17.

The pulling tongue 21 is also unique. The cut 34A ends, like the other cuts 34 depicted in FIG. 17, in a 45° folding-line start 33B in the direction of the end of the folding line 33D which is near it. In the prolongation of this folding-line start 33B, there is a 45° opening line 34C contrived in the panel 31A. This opening line 34C is not necessarily fluid-tight seeing that this portion of the panel 31A will superimpose the panel 30E after assembly of the package, as shown in FIG. 18. The blank is supplemented by another opening line 34E, comprising a first portion superimposed on a portion of the folding line 33 and two end portions, perpendicular to the preceding first portion. A first end portion joins, and more specifically terminates at, the opening line 34C and the other end portion is contrived on a portion of the width of the panel 30E and ends in a cut 34D in the rest of the width of panel 30E. Alternatively, cut line 34D is eliminated and the other portion of knurled line 34E extends across the entire width of panel 30E.

The use of this opening for the pack 1 is understandable vis-à-vis FIG. 18, where the pack viewed from above is supplemented by a guarantee blank 11B of the same type as that of FIGS. 1 and 2. Seizing the tongue 21, one effects a movement which first tears the opening line 34C, this movement permitting lifting of the portion of the panel 30E which superimposes it. This lifting is facilitated by the cut 34D in the panel 30E, after which pulling away of the package portions may continue owing to the knurled opening lines 34E contrived on the periphery of the portions to be withdrawn. An additional feature of this opening comes from the fact that it is possible to have only a reduced opening of the pack, for the portion of the panel 31A disposed outside of the pulled-away portion adjacent to the tongue 21 need not be directly removed. As is seen in FIG. 18, the guarantee strip 11B is positioned so as to run alongside the transverse portions of the opening line 34E, which further facilitates the opening of line 34E. Thus, the position of the end portions of the opening line 34E on the panels 30E and 31A is determined by the location and the dimensions of the guarantee strip 11B. It is also possible to provide the bottom of the pack with an opening as described above. As concerns the other preferred particularities of this blank, the cuts 34 are made as explained vis-à-vis FIGS. 5C and 5D, the folding lines 33C on the panels 30E and 30F are made as explained vis-à-vis FIG. 11, and the pulling tongue 20 acts upon a pull strip 20A made up by knurling as explained vis-à-vis FIG. 7.

Figure 19A:
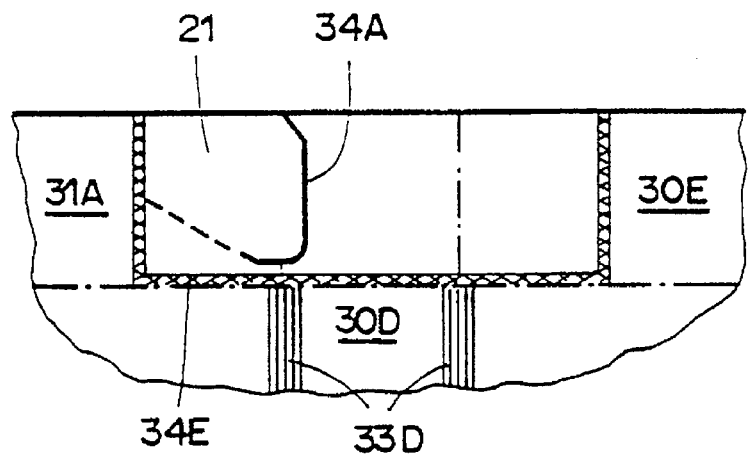
FIG. 19A, 19B and 19C depict three possible variations of one of the openings of the pack.
Figure 19B:
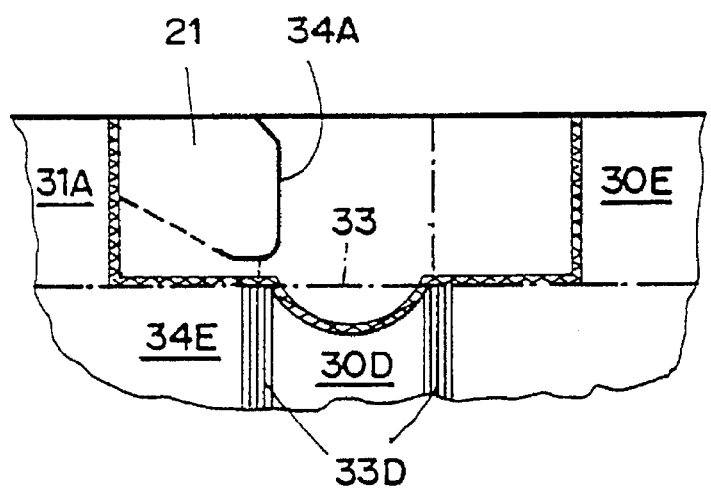
Figure 19C:
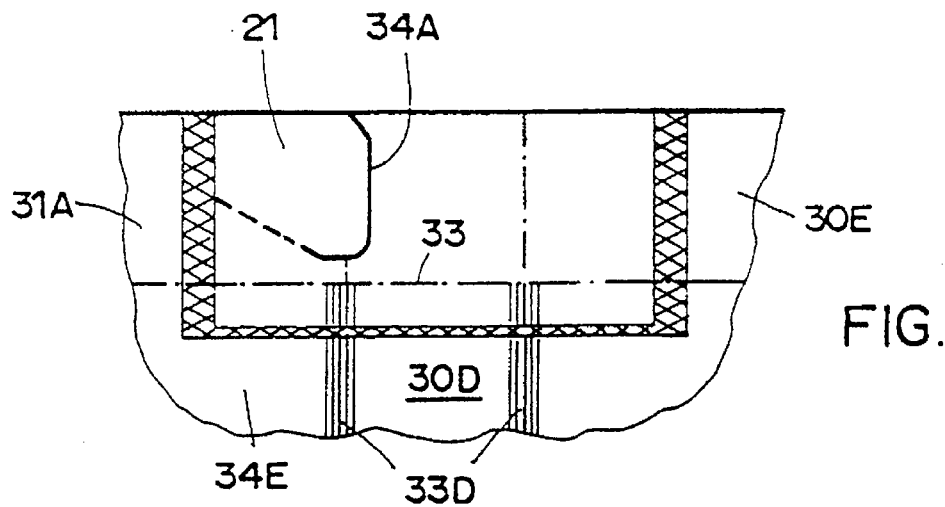

FIGS. 19A, 19B and 19C depict some possible modifications of the knurled opening lines 34E already seen in FIG. 17. In FIG. 19A, the opening lines arranged on the panels 31A and 30E traverse the panels entirely. In FIG. 19B, the opening line disposed alongside the panel 30D penetrates into the panel in a unrectilinear shape, e.g., this portion of the opening line arcs in curvilinear fashion onto panel 30D. The knurled lines depicted in FIG. 19C are respectively wider as far as the two side portions are concerned whereby the central portion is shifted with respect to the folding line 33, as discussed below. These examples show that it is possible to adapt the openings of the upper face as well as that of the lower face in order to make it easier to open the pack of cigarettes.

It should be noted that the knurled lines are also known to one skilled in the art as embossed lines.

FIG. 20 shows a blank 3 combining certain previously described modifications and making it possible to achieve a pack, the upper and under faces of which are flat folded, as in FIG. 6, although each corners of the pack are formed by a diamond-shaped folding, as described in relation with FIG. 5D. In another or supplemental alternative, the knurled line 34E is superimposed over an upper portion of the panels 30A, 30D and 30B between fold line 33 and tear strip 20A, as shown in FIG. 19C. Alternatively, the embodiment at FIGS. 19A or 19B is employed in the embodiment of FIG. 20.

As indicated previously, subject to the optional fluid-tight opening lines comprising pre-cuts made in the thickness of the blank, the blank may remain as is, i.e., made up solely of a sheet of paper having already received or receiving later the printing of the logo of the brand of cigarettes as well as the indications usually appearing on a pack of cigarettes. The blank may also be covered with a laminated coating and/or with a coating of lacquering.

It is to be noted that, as has been said previously, the blanks according to any one of the embodiments described may be devised without creation of cutting scraps during manufacture. The blanks mentioned above have been described according to diverse embodiments or modifications of the pulling tongues, folding lines, cuts, and opening lines. These diverse embodiments or modifications may be combined with one another in a single type of package.

Thus, by the judicious conformation of a blank according to one or the other of the embodiments described above, it is possible to obtain a package for a pack of cigarettes or of any other product of the tobacco industry not encountering the drawbacks of the known packages and further comprising several significant additional advantages. A package of this type is particularly ecological to the extent that it uses a minimum of raw materials. A single type of material is used, thus rendering its disposal after use easier, all the more so if it is made up of are recyclable and/or biodegradable material. In addition, the present invention guarantees effective protection of its contents against light, transfer of humidity, loss of aroma or of flavor at the time of storage. The cost price of such a package is potentially generally less than that of a package of known type. The user, too, encounters advantages in using such a package since, while retaining the advantages of the prior packages, this new type of package permits him to choose among several ways of opening his pack of cigarettes, i.e., as in an ordinary soft pack or as in a hard pack, or even permitting him to reach the cigarettes without touching their filters.

Many improvements, modifications and substitutions may be apparent to the skilled artisan without departing from the spirit and scope of the present invention as described and defined in the foregoing description and the following claims.

We claim:

1. A package for cigarettes comprising:
    a front wall, a rear wall, first and second side walls, a bottom wall and a top wall, said walls joined to form a box which defines a receptacle for cigarettes; and
    a tear strip defined in said front, rear, and first and second side walls, said tear strip comprising an opening line having a first depression relative to a wall outer surface and at least one adjacent depression deeper than said first depression,
    a tongue extending from said tear strip,
    said tear strip completely separating the defined box into an upper portion comprising said top wall and an upper part of said front wall, rear wall, and first and second walls and into a lower portion comprising said bottom wall and a lower part of said front wall, rear wall, and first and second side walls, said lower portion defining a receptacle for cigarettes.

2. The package according to claim 1, wherein said depressions are filled with a coating.

3. The package according to claim 2, wherein said coating is planar with a wall outer surface.

4. The package according to claim 1, wherein said tear strip is defined by an opening line, and further comprising an adhesive strip underlying said opening line and facing toward the defined receptacle, said tongue connected to said adhesive strip.

5. The package according to claim 4, further comprising a traction strip underlying said adhesive strip.

6. The package according to claim 5, wherein said tongue is connected to an end of said traction strip.

7. The package according to claim 1, further comprising first means for opening a portion of said bottom wall and second means for opening a portion of said top wall.

8. The package according to claim 7, wherein said first opening means comprises a first tongue extending from the portion of said bottom wall, said first tongue extending past one of said side, front and rear walls and wherein said second opening means comprises a second tongue extending from the portion of said top wall, said second tongue extending past one of said side, front and rear walls.

9. A refillable package for cigarettes, comprising
    a package as claimed in claim 1 as a refill package, and
    an outer case into which said package fits.

10. A package for cigarettes comprising:
    a front wall, a rear wall, first and second side walls, a bottom wall and a top wall, said walls joined to form a box which defines a receptacle for cigarettes;
    said top wall being foldably connected to one of said front or back walls, and having a first top side attachment panel foldably connected to said first side wall, a second top side attachment panel foldably connected to said second side wall, and a third top side wall attachment panel foldably connected to the other of said front wall or back wall, said top wall overlying said first, second and third attachment panels;
    a tongue extending from at least one of said top side attachment panels and overlying at least one of said first and second side walls; and
    a separator for completely separating the defined box into an upper portion comprising said top wall and an upper part of said front wall, rear wall, and first and second walls and into a lower portion comprising said bottom wall and a lower part of said front wall, rear wall, and first and second side walls, said lower portion defining a receptacle for cigarettes.

11. The package according to claim 10, wherein said tongue further comprises a first tear line extending across said at least one top side attachment panel and a second tear line extending across said overlying top wall, said second tear line overlying said first tear line.

12. The package according to claim 10, further comprising a continuous opening line for opening a portion of said top wall, a portion of said third top side attachment panel and an outer edge of an interposed said first or second top side attachment panel.

13. The package according to claim 10, further comprising a continuous opening line for opening a portion of both of said frontal walls and one of said side walls located therebetween.

14. A refillable package for cigarettes, comprising
    a package as claimed in claim 10 as a refill package, and
    an outer case into which said package fits.

15. A blank for forming a package for cigarettes, the blank comprising:
    a side attachment panel, first frontal panel, first side panel, second frontal panel and second side panel, said panels respectively interconnected via vertical folding lines;
    a first top attachment panel connected to one of said frontal panels via a horizontal folding line;
    a top panel connected to the other of said frontal panels via a horizontal folding line;
    a second top attachment panel connected to said first side panel via a horizontal folding line;
    a third top attachment panel connected to said side attachment panel via a horizontal folding line;
    a first bottom attachment panel connected via a horizontal folding line to the same one of said frontal panels as said first top attachment panel;

a bottom panel connected to the other of said frontal panels via a horizontal folding line;

a second bottom attachment panel connected to said first side panel via a horizontal folding line;

a third bottom attachment panel connected to said side attachment panel via a horizontal folding line; and respective cut lines separating
- said first top attachment panel from said second top attachment panel,
- said first top attachment panel from said third top attachment panel,
- said second attachment panel from said top panel,
- said first bottom attachment panel from said second bottom attachment panel,
- said first bottom attachment panel from said third bottom attachment panel, and
- said second bottom attachment panel from said bottom panel, wherein at least one of said cut lines extends from an outer edge of two of said panels and extends between a portion of said two panels separated by said at least one of said cut lines, an associated fold line extends between said two panels for a remaining portion of said two panels, and at least one cut line comprises two spaced apart cut lines, said two cut lines being initially approximately parallel from said outer edge and approaching one another to join at an end of the associated fold line.

16. A blank for forming a package for cigarettes, the blank comprising:

a side attachment panel, first frontal panel, first side panel, second frontal panel and second side panel, said panels respectively interconnected via vertical folding lines;

a first top attachment panel connected to one of said frontal panels via a horizontal folding line;

a top panel connected to the other of said frontal panels via a horizontal folding line;

a second top attachment panel connected to said first side panel via a horizontal folding line;

a third top attachment panel connected to said side attachment panel via a horizontal folding line;

a first bottom attachment panel connected via a horizontal folding line to the same one of said frontal panels as said first top attachment panel;

a bottom panel connected to the other of said frontal panels via a horizontal folding line;

a second bottom attachment panel connected to said first side panel via a horizontal folding line;

a third bottom attachment panel connected to said side attachment panel via a horizontal folding line;

respective cut lines separating
- said first top attachment panel from said second top attachment panel,
- said first top attachment panel from said third top attachment panel,
- said second attachment panel from said top panel,
- said first bottom attachment panel from said second bottom attachment panel,
- said first bottom attachment panel from said third bottom attachment panel, and
- said second bottom attachment panel from said bottom panel, at least one pull opening line extending from an outer edge of said side attachment panel; across said one of said frontal panels, said first side panel, said other of said frontal panels; and to an outer edge of said second side panel; and, a second horizontal line on said third top attachment panel extending to said cut line between said third top attachment panel and said first top attachment panel;

wherein at least one of said cut lines extends from an outer edge of two of said panels and extends between a portion of said two panels separated by said at least one of said cut lines; an associated fold line extends between said two panels for a remaining portion of said two panels; and said horizontal fold line connecting said third top attachment panel and said side attachment panel is also an opening line.

17. A blank for forming a package for cigarettes, the blank comprising:

a side attachment panel, first frontal panel, first side panel, second frontal panel and second side panel, said panels respectively interconnected via vertical folding lines;

a first top attachment panel connected to one of said frontal panels via a horizontal folding line;

a top panel connected to the other of said frontal panels via a horizontal folding line;

a second top attachment panel connected to said first side panel via a horizontal folding line;

a third top attachment panel connected to said side attachment panel via a horizontal folding line;

a first bottom attachment panel connected via a horizontal folding line to the same one of said frontal panels as said first top attachment panel;

a bottom panel connected to the other of said frontal panels via a horizontal folding line;

a second bottom attachment panel connected to said first side panel via a horizontal folding line;

a third bottom attachment panel connected to said side attachment panel via a horizontal folding line;

respective cut lines separating
- said first top attachment panel from said second top attachment panel,
- said first top attachment panel from said third top attachment panel,
- said second attachment panel from said top panel,
- said first bottom attachment panel from said second bottom attachment panel,
- said first bottom attachment panel from said third bottom attachment panel, and
- said second bottom attachment panel from said bottom panel, at least one pull opening line extending from an outer edge of said side attachment panel; across said one of said frontal panels, said first side panel, said other of said frontal panels; and to an outer edge of said second side panel; and a vertical opening line on said top panel extending from an outer edge to the opening line portion, wherein at least one of said cut lines extends from an outer edge of two of said panels and extends between a portion of said two panels separated by said at least one of said cut lines; an associated fold line extends between said two panels for a remaining portion of said two panels; and a portion of said horizontal folding line connecting said top panel to the other of said frontal panels is an opening line.

18. A blank for forming a package for cigarettes, the blank comprising:

a side attachment panel, first frontal panel, first side panel, second frontal panel and second side panel, said panels respectively interconnected via vertical folding lines;

a first top attachment panel connected to one of said frontal panels via a horizontal folding line;

a top panel connected to the other of said frontal panels via a horizontal folding line;

a second top attachment panel connected to said first side panel via a horizontal folding line;

a third top attachment panel connected to said side attachment panel via a horizontal folding line;

a first bottom attachment panel connected via a horizontal folding line to the same one of said frontal panels as said first top attachment panel;

a bottom panel connected to the other of said frontal panels via a horizontal folding line;

a second bottom attachment panel connected to said first side panel via a horizontal folding line;

a third bottom attachment panel connected to said side attachment panel via a horizontal folding line;

respective cut lines separating
said first top attachment panel from said second top attachment panel,
said first top attachment panel from said third top attachment panel,
said second attachment panel from said top panel,
said first bottom attachment panel from said second bottom attachment panel,
said first bottom attachment panel from said third bottom attachment panel, and
said second bottom attachment panel from said bottom panel; and a vertical opening line on said top panel extending from an outer edge to the opening line portion, wherein at least one of said cut lines extends from an outer edge of two of said panels and extends between a portion of said two panels separated by said at least one of said cut lines; an associated fold line extends between said two panels for a remaining portion of said two panels; and at least one of said opening lines comprises a series of separated punctual cuts and means for ensuring fluid tightness of said punctual cuts.

19. A blank for forming a package for cigarettes, the blank comprising:

a side attachment panel, first frontal panel, first side panel, second frontal panel and second side panel, said panels respectively interconnected via vertical folding lines;

a first top attachment panel connected to one of said frontal panels via a horizontal folding line;

a top panel connected to the other of said frontal panels via a horizontal folding line;

a second top attachment panel connected to said first side panel via a horizontal folding line;

a third top attachment panel connected to said side attachment panel via a horizontal folding line;

a first bottom attachment panel connected via a horizontal folding line to the same one of said frontal panels as said first top attachment panel;

a bottom panel connected to the other of said frontal panels via a horizontal folding line;

a second bottom attachment panel connected to said first side panel via a horizontal folding line;

a third bottom attachment panel connected to said side attachment panel via a horizontal folding line; and respective cut lines separating
said first top attachment panel from said second top attachment panel,
said first top attachment panel from said third top attachment panel,
said second attachment panel from said top panel,
said first bottom attachment panel from said second bottom attachment panel,
said first bottom attachment panel from said third bottom attachment panel, and
said second bottom attachment panel from said bottom panel;

wherein at least one of said cut lines extends from an outer edge of two of said panels and extends between a portion of said two panels separated by said at least one of said cut lines; an associated fold line extends between said two panels for a remaining portion of said two panels; and at least one of said cut lines is an opening lines comprising a depression in said panels.

20. The blank according to claim 19 wherein said depression comprises a first region of an initial depth and at least one additional region having a deeper depth.

21. The blank according to claim 20, further comprising means for ensuring fluid-tightness of said at least one cut line.

22. The blank according to claim 21, further comprising means for rendering said depression planar with panel surfaces.

23. The blank according to claim 19, further comprising a diagonal fold line extending across said first top attachment panel from an outer edge to an intersection of said vertical fold line connecting said first top attachment panel to said second top attachment panel and of said horizontal fold line connecting said first top attachment panel to said one of said frontal panels.

24. The blank according to claim 23, further comprising a diagonal fold line extending across said first bottom attachment panel from an outer edge to an intersection of said vertical fold line connecting said first bottom attachment panel to said second bottom attachment panel and of said horizontal fold line connecting said first bottom attachment panel to said one of said frontal panels.

25. The blank according to claim 23, further comprising a diagonal fold line on said top panel extending from an outer edge to an intersection of said horizontal fold line connecting said top panel to the other of said frontal panels and of said vertical fold line connecting the other of said frontal panels to said first side panel.

26. The blank according to claim 23, further comprising a diagonal fold line on said top panel extending from an outer edge to an intersection of said horizontal fold line connecting said top panel to the other of said frontal panels and of said vertical fold line connecting the other of said frontal panels to said second side panel.

27. The blank according to claim 23, further comprising a diagonal fold line on said bottom panel extending from an outer edge to an intersection of said horizontal fold line connecting said bottom panel to the other of said frontal panels and of said vertical fold line connecting the other of said frontal panels to said first side panel.

28. The blank according to claim 23, further comprising a diagonal fold line on said bottom panel extending from an outer edge to an intersection of said horizontal fold line connecting said bottom panel to the other of said frontal panels and said vertical fold line connecting the other of said frontal panels to said second side panel.

29. The blank according to claim 23, wherein a tongue is defined on said top panel by a portion of said diagonal line and a cut line.

30. The blank according to claim 29, further comprising a diagonal fold line on said bottom panel extending from an outer edge to an intersection of said horizontal fold line connecting said bottom panel to the other of said frontal panels and of said vertical fold line connecting the other of said frontal panels to said first side panel.

31. A blank for forming a package of cigarettes, the blank comprising: a frontal panel;

a side panel connected to said frontal panel via a first vertical fold line;

a first top panel connected to said frontal panel via a first horizontal fold line;

a second top panel connected to said side panel via a second horizontal fold line;

a second fold line extending between a portion of said first and second top panels;

a cut line extending between a remainder of said first and second top panels from said second vertical fold line to an outer edge of said first and second top panels, said cut line comprising two spaced apart cut lines, said two cut lines being initially approximately parallel from said outer edge and approaching one another to join at said second fold line, wherein said first horizontal fold line is aligned with said second horizontal fold line, said first vertical fold line perpendicularly intersects said aligned first and second horizontal fold lines, and said second fold line is aligned with said first vertical fold line.

32. A blank for forming a package for cigarettes, the blank comprising:

a side attachment panel, first frontal panel, first side panel, second frontal panel and second side panel, said panels respectively interconnected via vertical folding lines;

a first top attachment panel connected to one of said frontal panels via a horizontal folding line;

a top panel connected to the other of said frontal panels via a horizontal folding line;

a second top attachment panel connected to said first side panel via a horizontal folding line;

a third top attachment panel connected to said side attachment panel via a horizontal folding line;

a first bottom attachment panel connected via a horizontal folding line to the same one of said frontal panels as said first top attachment panel;

a bottom panel connected to the other of said frontal panels via a horizontal folding line;

a second bottom attachment panel connected to said first side panel via a horizontal folding line;

a third bottom attachment panel connected to said side attachment panel via a horizontal folding line; and respective cut lines separating said first top attachment panel from said second top attachment panel;

said first top attachment panel from said third top attachment panel;

said second attachment panel from said top panel;

said first bottom attachment panel from said second bottom attachment panel;

said first bottom attachment panel from said third bottom attachment panel, and said second bottom attachment panel from said bottom panel;

wherein at least one of said cut lines extends from an outer edge of two of said panels and extends between a portion of said two panels separated by said at least one of said cut lines; an associated fold line extends between said two panels for a remaining portion of said two panels; and at least one of said horizontal fold lines is knurled.

33. The blank according to claim 32 wherein said at least one knurled horizontal line has a width which is approximately a quarter of the diameter of one of the cigarettes to be packaged.

34. The blank according to claim 32, wherein all of said horizontal lines are knurled.

35. The blank according to claim 34, wherein each of said knurled horizontal lines has a respective width which is approximately a quarter of the diameter of one of the cigarettes to be packaged.

* * * * *